US012555844B1

(12) United States Patent
Borghi

(10) Patent No.: US 12,555,844 B1
(45) Date of Patent: Feb. 17, 2026

(54) BATTERY THERMAL MANAGEMENT SYSTEM

(71) Applicant: Cory Borghi, Wixom, MI (US)

(72) Inventor: Cory Borghi, Wixom, MI (US)

(73) Assignee: BORGHI LLC, Wixom, MI (US)

( * ) Notice: Subject to any disclaimer, the term of this patent is extended or adjusted under 35 U.S.C. 154(b) by 656 days.

(21) Appl. No.: 17/933,074

(22) Filed: Sep. 16, 2022

Related U.S. Application Data

(60) Provisional application No. 63/244,966, filed on Sep. 16, 2021.

(51) Int. Cl.
*H01M 10/65* (2014.01)
*H01M 10/6556* (2014.01)
*H01M 10/6568* (2014.01)

(52) U.S. Cl.
CPC ... *H01M 10/6556* (2015.04); *H01M 10/6568* (2015.04)

(58) Field of Classification Search
CPC ......... H01M 10/6556; H01M 10/6557; H01M 10/6554; H01M 10/6555; H01M 10/6551; H01M 10/6568; H01M 10/6567
See application file for complete search history.

(56) References Cited

U.S. PATENT DOCUMENTS

2018/0062226 A1\* 3/2018 Raiser ................ H01M 10/613

\* cited by examiner

*Primary Examiner* — Raymond Alejandro
(74) *Attorney, Agent, or Firm* — NEXUS IP LAW PLLC

(57) ABSTRACT

A system for parallel thermal management of one or more battery cells may include a tower plate and a nozzle plate. The tower plate may include a plurality of tower protrusions, each having a closed distal end, an open proximal end, and inwardly curved sidewalls extending between the closed distal end and the open proximal end. The nozzle plate may include a plurality of nozzle protrusions, each having an open distal end, an open proximal end, outwardly curved sidewalls extending between the open distal end and open proximal end, and radially extending fins extending at least a portion of the outwardly curved sidewalls.

20 Claims, 17 Drawing Sheets

BATTERY THERMAL MANAGEMENT SYSTEM

CROSS-REFERENCE TO RELATED APPLICATION

This US Non-Provisional Patent Application is based on and claims priority to U.S. Provisional Patent Application No. 63/244,966 filed Sep. 16, 2021, which is hereby incorporated by reference in its entirety.

BACKGROUND

Traditional battery packs utilize an overall thermal management system. Typically, fluid passes along the overall battery pack, cooling cells in series from an inlet side to an outlet side of the battery pack. The fluid cools the cells in a series arrangement while the temperature of the fluid rises between the inlet and outlet sides. The outlet side experiences diminished cooling and higher temperatures than the inlet side, thereby asymmetrically accelerating thermal stress and deterioration of the outlet side relative to the inlet side. This accelerated wear on the outlet side ultimately reduces the performance and overall life of the battery pack.

There is a need for an improved system and method for battery thermal management. This may include an improved arrangement and/or structures to optimize temperature distribution for warming and/or cooling one or more battery cells on a cell-by-cell basis and normalize thermal distribution along the battery pack. Embodiments may include a series arrangement for cell-by-cell temperature distribution, distributed stress and wear along the battery pack, and improved thermal management of the overall battery pack. This may provide for optimized charge rates, cell performance symmetry, and battery pack longevity.

DETAILED DESCRIPTION

Figure 1:
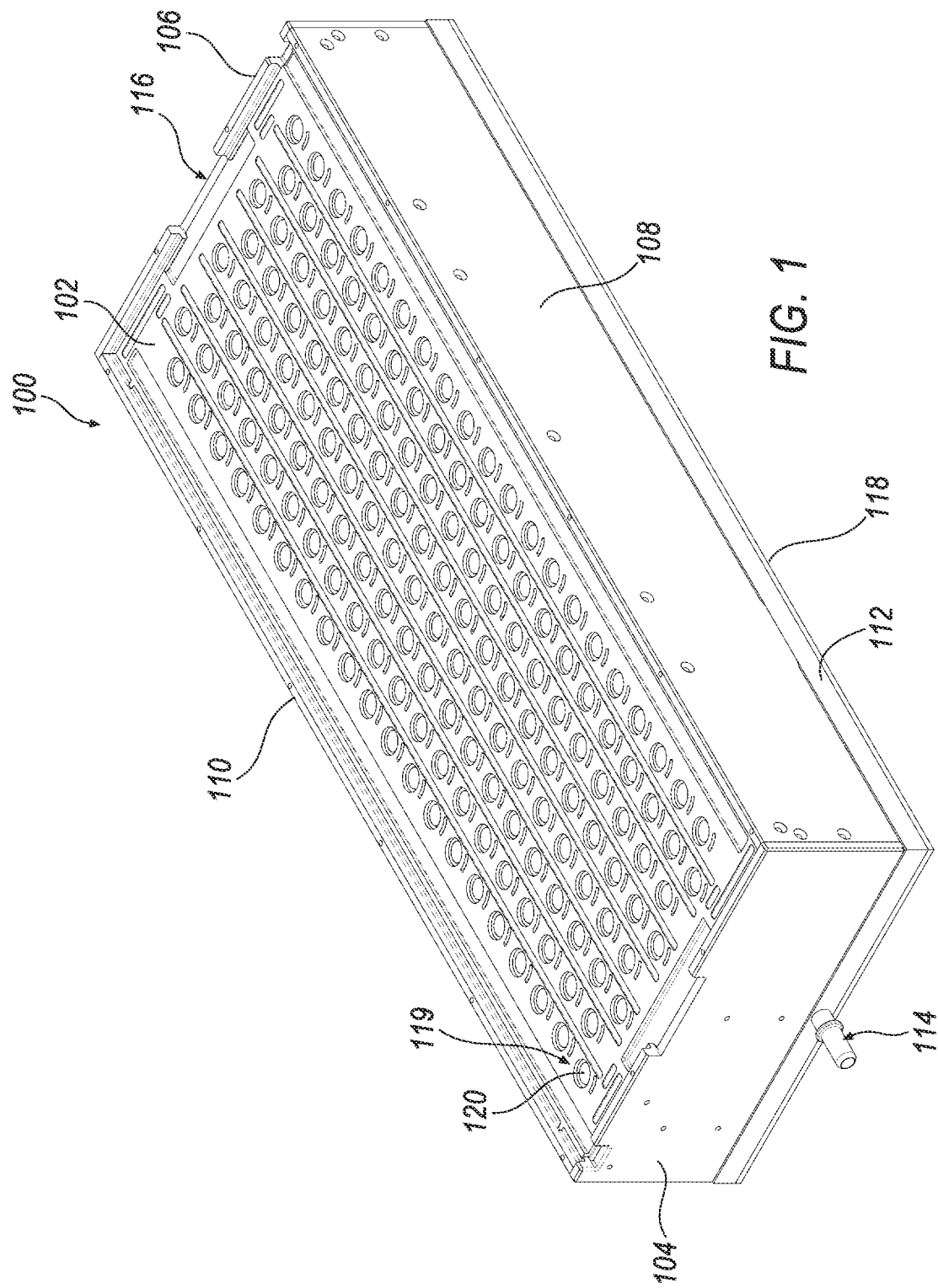
FIG. 1 illustrates a perspective view of an exemplary system of the present disclosure.

Embodiments include improved systems and methods for optimizing and maintaining the temperature of battery cells, modules, and packs within safe operating limits. Batteries that will require high rates of charge and discharge will generate copious quantities of heat. A battery "C" rating is a current at which a battery can be charged and discharged, e.g., such that a higher C rating creates more heat in the battery cell and a lower C rating creates less. A battery with a lower C rating generates less heat and thus optimizes charging and battery life.

Excessive heat in battery cells increases battery degradation and shortens battery life. It also has the potential for creating a thermal runaway event if the battery is operating outside of its normal operating temperature. Maintaining a safe operating temperature will allow the batteries to perform better and have a longer lifespan.

Embodiments of the present disclosure provide a variety of advantages and improvements. The systems herein may include a parallel thermal management system providing a flow of thermal management fluid in a lengthwise or vertical direction along the battery, e.g., rather than a series system providing a flow of fluid in a widthwise or horizontal direction.

The system herein may include a parallel thermal management system. This provides cell-by-cell thermal management in which fluid travels along each cell, collects heat for a short duration, and passes to a collector to exit the system, e.g., discharging the fluid before excess heat accumulation. This provides advantages over a typical series system that passes fluid from the inlet side to the outlet side of the battery pack, continuously accumulating heat as it travels through the system. The system herein is configured to pass fluid to one or a subset of battery cells and bypasses the remaining battery cells to discharge the heated fluid, thereby providing a more efficient thermal management flow loop for heating during startup and cooling during operation and charging.

Embodiments may be configured for all types of advanced thermal management systems. The systems herein may be configured for vehicles, inverter-based systems, fuel cells, and stationary power systems. The system may be configured for all types of electric vehicles including plug-in hybrid electric vehicles (PHEVs), battery electric vehicles (BEVs), hybrid electric vehicles (HEVs), and fuel cell electric vehicles (FCEV). Embodiments may be utilized with power inverters, systems configured for power generation, or a combination thereof.

Embodiments may include tower and/or nozzle arrangements with corresponding plates and/or protrusions configured for thermal management including cooling and/or heating as disclosed herein. Exemplary systems may include batteries, fuel cells, inverter systems, converter systems, glycol-based systems, water-based systems, or a combination thereof. Systems may be configured to optimize fluid flow and associated thermal management.

In embodiments, systems may be configured for the thermal management of electrical components that require heat dissipation and/or cooling. Exemplary systems may include inverters, converters, transistors, semiconductors, diodes, insulated-gate bipolar transistors (IGBTs), metal-oxide-semiconductor field-effect transistors (MOSFETs), and other electrical components with fluid-contact surfaces (e.g., cold plates and/or heat sinks). The embodiments herein may provide increased fluid-contact surfaces for improved temperature consistency across the majority or entirety of the surface thereof. Systems may include tower and nozzle plates and corresponding protrusions as disclosed herein to direct fluid for improved flow efficiency, turbulence, and/or heat extraction. The systems may include a parallel arrangement with improved heat dissipation and/or extraction over the fluid-contact surface, thereby reducing heat accumulation associated with traditional linear, inline, serial, and series configurations.

The present disclosure employs a system and method for battery thermal management. Embodiments include an arrangement for thermally managing a battery cell or a plurality or cluster of battery cells of a module. The system may include one or more inlets and outlets (e.g., with or without connectors), lower and upper collectors, nozzles, towers, and circulation chambers. The nozzles and towers may include respective proximal ends, distal ends, and one or more walls extending between the proximal and distal ends. The walls of the nozzles and towers may include respective inner and outer surfaces.

The system may be arranged to optimize heat transfer between one or more towers surrounding each battery cell. The system may be arranged such that fluid flows into the inlet, a first collector, upwardly through each nozzle to the respective circulation chamber, along the inside surface of each respective tower to the first or a second collector, thereby transferring heat between one or more towers and adjacent one or more battery cells.

The system may include one, multiple, or varying configurations. The tower may include a closed distal end and an open proximal end forming an internal cavity, and the tower may extend a portion or an entirety of a lengthwise or vertical direction of a battery cell. The nozzle may include open proximal and distal ends and may extend a portion or an entirety of the internal cavity of the tower. The nozzle may be arranged to pass fluid from the collector to a circulation cavity, and the tower may be arranged to extract heat from the fluid in the circulation cavity, through the wall of the tower and to one, multiple, or all sides of a battery cell.

Embodiments may be arranged to optimize flow along one or more cells. The fluid travels under the cells and is forced up through a nozzle inside the tower. The fluid then travels down the inside of the tower contacting the inner tower walls and extracting the adjacent heat from the battery cells. The fluid is then collected and flows out of the system to discharge the fluid or repeat the process. Embodiments may be arranged to provide a flow of fluid in opposite and additional directions.

An exemplary system may include a battery thermal management system for parallel thermal management of battery cells. The system may include a tower plate including a plurality of tower protrusions, with each having a closed distal end and an open proximal end forming a tower cavity with curved sidewalls. The system may include a nozzle plate including a plurality of nozzle protrusions, with each having an open distal end and a circumference with radially extending fins configured to be received relative to the curved sidewalls of the tower cavity.

A method may include battery thermal management by parallel heating and/or cooling of one or more battery cells. The method may include providing a collector including an inlet, a lower surface, an upper surface, and an outlet. The method may further include providing a tower plate including a plurality of tower protrusions, each having a closed distal end and an open proximal end forming a tower cavity with curved sidewalls. The method may include providing a nozzle plate including a plurality of nozzle protrusions, each having an open distal end and a circumference with radially extending fins configured to be received relative to the curved sidewalls of the tower cavity. The method may include parallel heating and/or cooling the respective one or more battery cells by passing fluid through the inlet, along the lower surface of the collector, through the plurality of nozzle protrusions, between respective sets of the plurality of nozzle protrusions, and the plurality of tower protrusions, along the upper surface of the collector, and through the outlet.

FIGS. 1-26 illustrate exemplary systems 100, for example, thermal management systems. System 100 may take many different forms and include multiple and/or alternate components, structures, and arrangements. While exemplary systems are shown, the exemplary components are not intended to be limiting, and additional or alternative components and/or implementations may be used.

Figure 2:
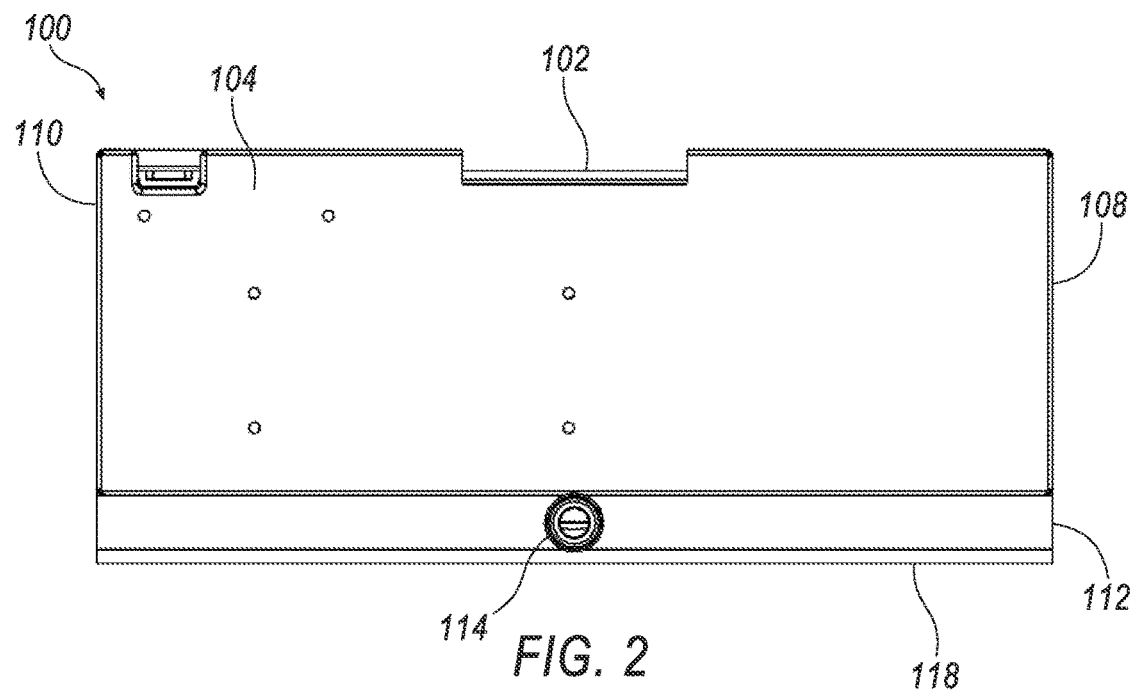
FIG. 2 illustrates a front view of an exemplary system of the present disclosure.
Figure 3:
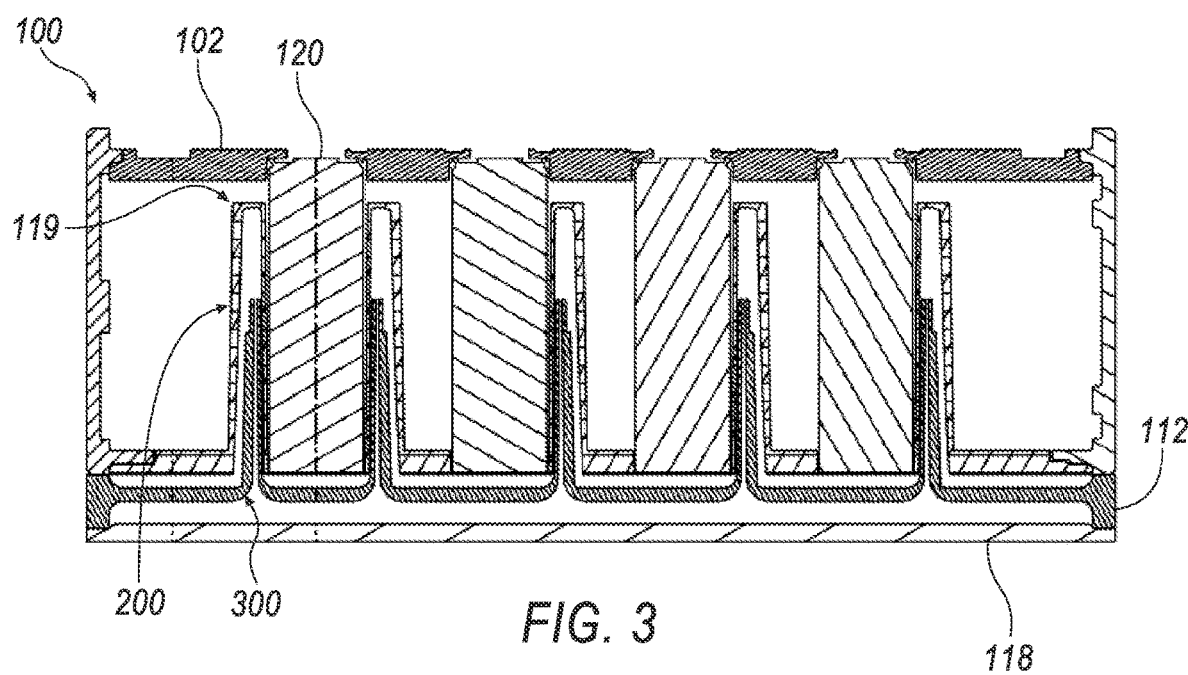
FIG. 3 illustrates a vertical cross-section view of an exemplary system of the present disclosure.
Figure 4:
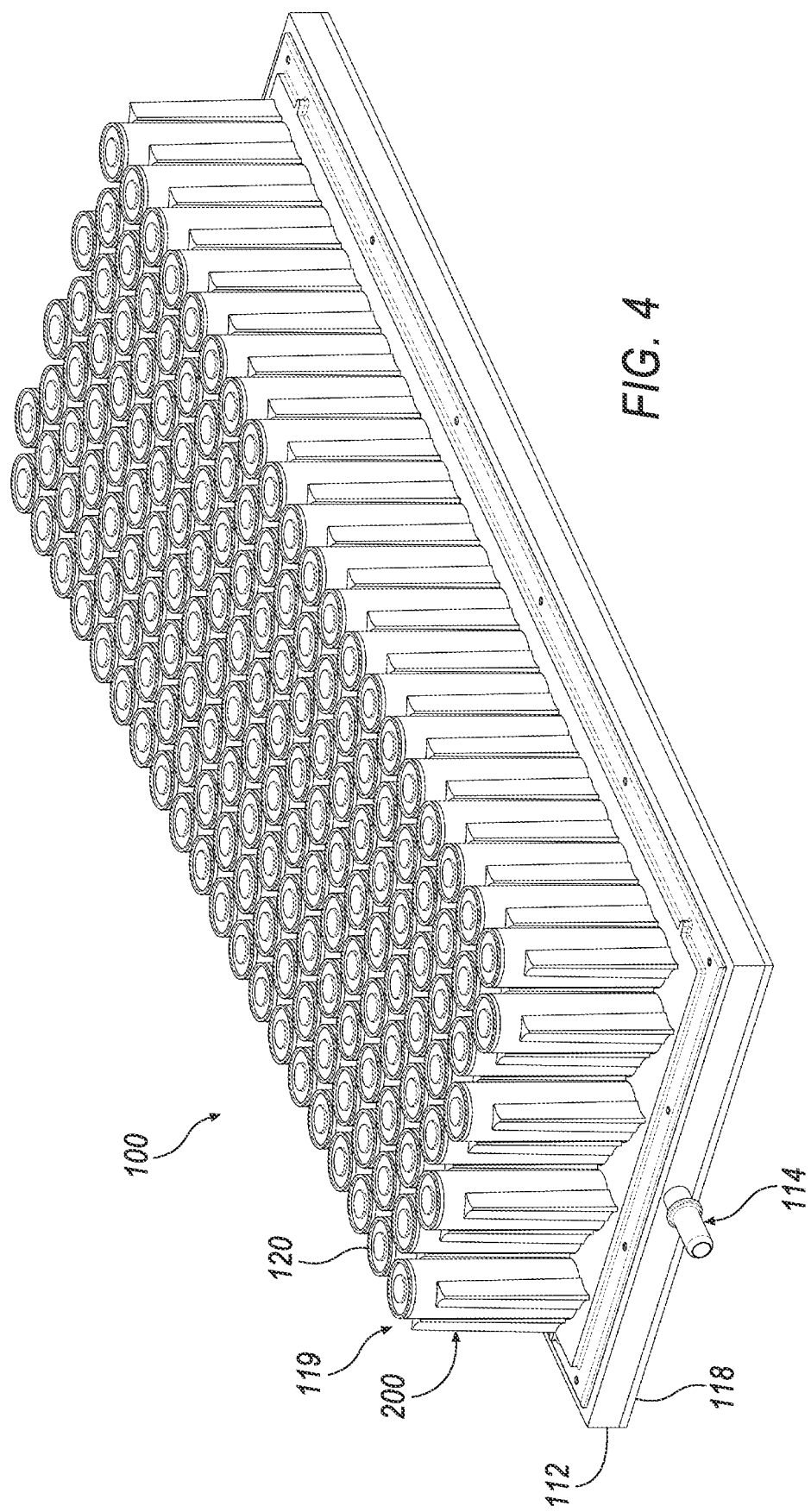
FIG. 4 illustrates a perspective view of an exemplary system of the present disclosure, e.g., a plurality of battery cells, a tower plate, and a collector.
Figure 5:
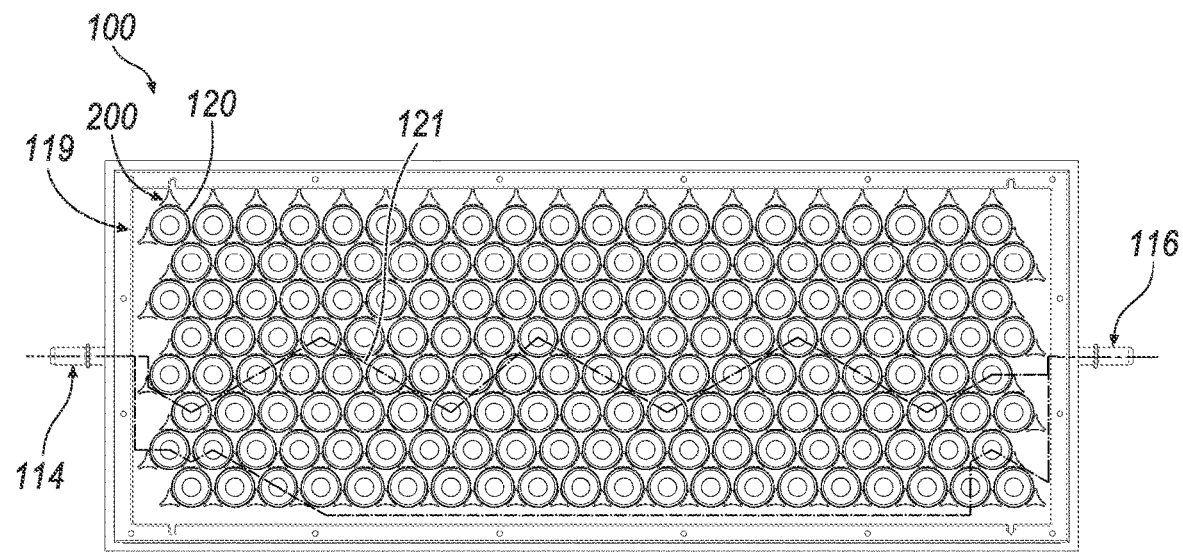
FIG. 5 illustrates a top view of FIG. 4.
Figure 6:
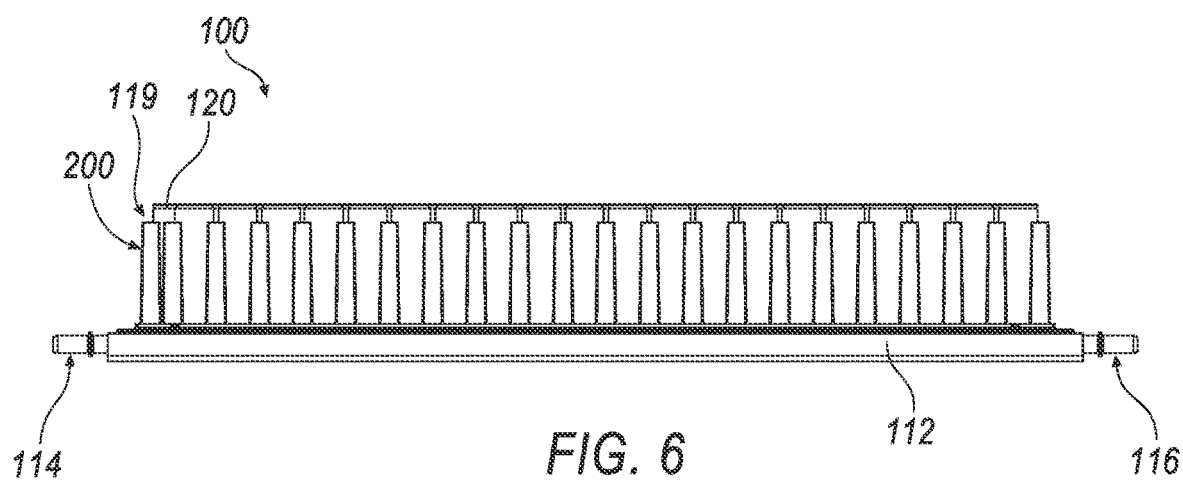
FIG. 6 illustrates a side view of FIG. 4.

FIGS. 1-3 illustrate an exemplary system 100 of the present disclosure, e.g., a battery thermal management system. System 100 may include top plate 102, intake wall 104, discharge wall 106, sidewalls 108, 110, collector 112, and bottom plate 118. System 100 may include inlet 114 and outlet 116. Upper wall 102 may include a plurality of battery cradles 119 for one or more corresponding battery cells 120.

Figure 12:
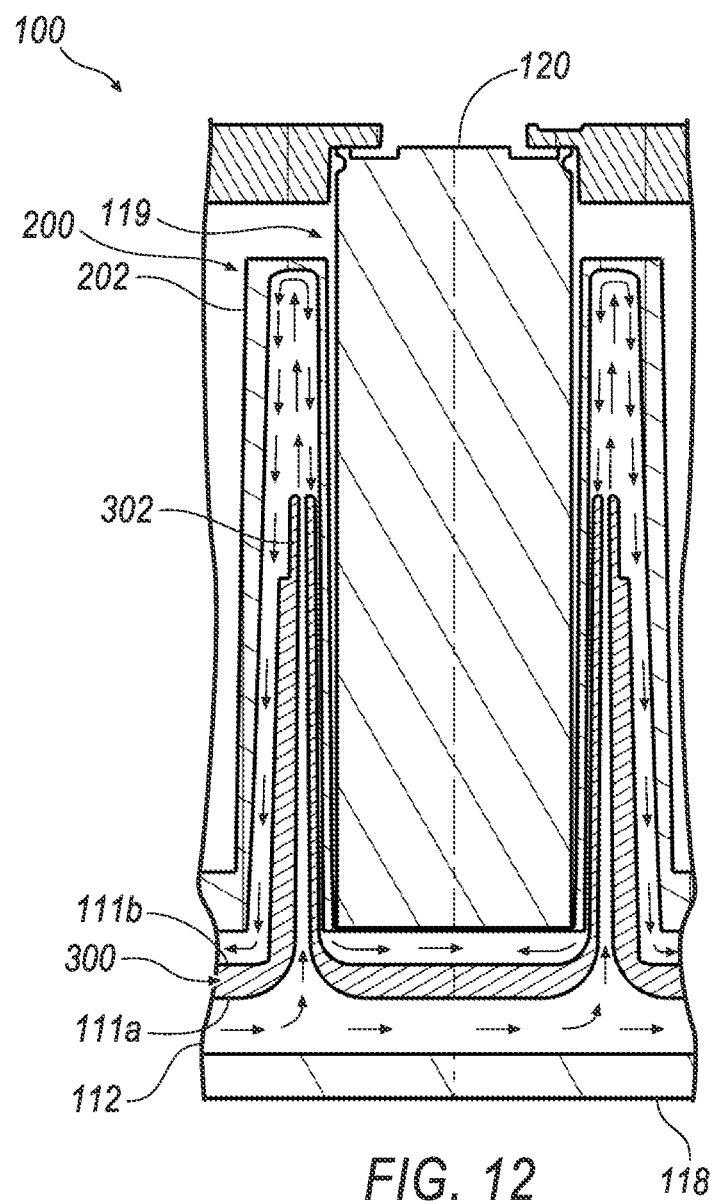
FIG. 12 illustrates a closer vertical cross-section view of FIG. 3.

As shown in FIGS. 2-3 and closer in FIG. 12, system 100 may include inlet 114, outlet 116, collector 112, tower plate 200, and nozzle plate 300. Collector 112 may include vertical sidewalls extending downward from tower plate 300. The collector may include one or more inlet 114 and/or outlet 116. Collector 112 may be part of or separate from nozzle plate 300. Tower plate 200 and nozzle plate 300 may include outwardly, inwardly, downwardly, and upwardly facing surfaces to direct fluid between inlet 114 and outlet 116.

System 100 may be arranged to direct fluid from inlet 114 to a first or lower surface 111a of collector 112, through and along nozzle plate 300 (e.g., inwardly facing surfaces), to and along tower plate 200 (e.g., outwardly, inwardly, and downwardly facing surfaces), between and along tower plate 200 (e.g., inwardly facing surfaces) and nozzle plate 300 (e.g., outwardly facing surfaces), between and along tower plate 200 (e.g., inwardly facing surfaces) and a second or upper surface 111b of collector 112 (e.g. upwardly facing surfaces), and out of outlet 116.

Referring to FIGS. 3-6, system 100 may include one or more battery cradles 119. Battery cradles 119 may be arranged in an array configured for thermal optimization. The array may include a thermal transfer and/or flow configuration 121, e.g., non-linear, linear, curved, staggered, offset, non-continuous, continuous, alternating, patterned, random, or a combination thereof.

Battery cradle 119 may be configured to partially or entirely encapsulate one or more batteries 120. Battery cradles 119 may be formed by tower plate 200 with one or a plurality of towers, nozzle plate 300 with one or a plurality of nozzles, or a combination thereof. Battery cradles 119 may be connected with interconnections, e.g., unitary, integrated, modular, detachable, or a combination thereof. Battery cradle 119 is configured to optimize heat transfer to and/or from batteries 120.

Figure 7:
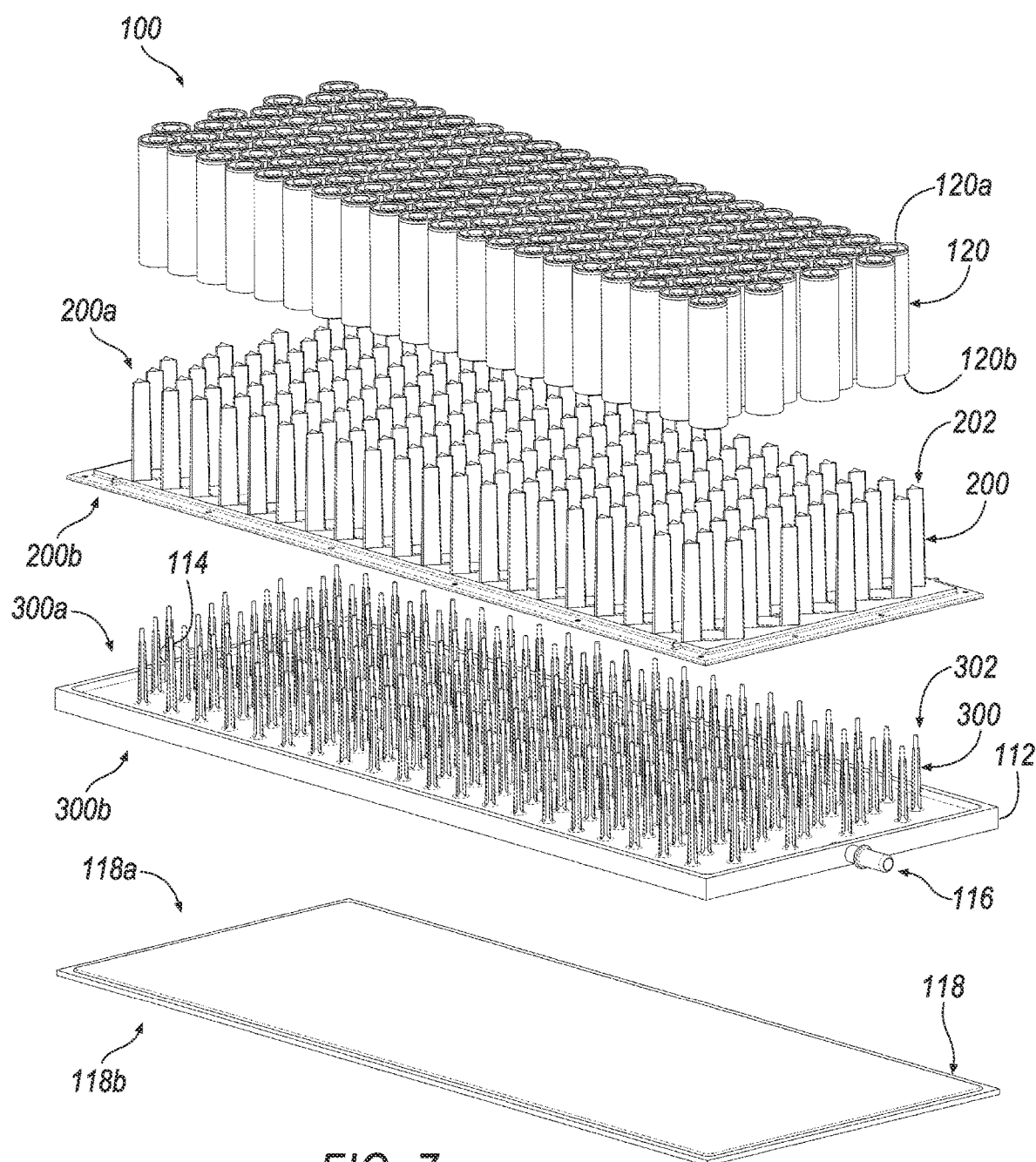
FIG. 7 illustrates an exploded view of FIG. 4.

As shown in FIG. 7, system 100 may include batteries 120, tower plate 200, nozzle plate 300, collector 112, and bottom plate 118. Battery 120 may include upper end 120a and lower end 120b. Tower plate 200 may include upper surface 200a and lower surface 200b. Nozzle plate 300 may include upper surface 300a and lower surface 300b. Bottom plate 118 may include upper surface 118a and lower surface 118b.

Lower end 120b of battery 120 may be received in upper surface 200a of tower plate 200. Nozzle protrusions 302 of nozzle plate 300 may be received in lower surface 200b of tower plate 200. Upper surface 118a of bottom plate 118 may be positioned against or received in lower surface 300b of nozzle plate 300. As such, system 100 provides fluid flow between each tower plate 200, nozzle plate 300, and bottom plate 118. Tower protrusions 202 and nozzle protrusions 302 may be arranged in an array of adjacent sets to provide multi-directional fluid flow.

Any portion of system 100, e.g., tower plate 200 and/or nozzle plate 300, may include any thermally conductive and/or electrically insulative material to optimize the heating and/or cooling of battery cells 120. Exemplary materials may include solids, coatings, compounds, and/or fluids. This may include materials that entirely or partially include plastic, polymer, metal, ceramic, boron arsenide, diamond, silver, copper, gold, silicon carbide, beryllium oxide, aluminum, tungsten, graphite, zinc, or a combination thereof.

Collector 112 may include tower plate 300 having one or more nozzles configured to be received in a corresponding one or more towers of tower plate 300. Collector 112 may include a first or lower cavity relative to bottom plate 118 and a second or upper cavity relative to tower plate 300. Collector 112 may receive fluid from inlet 114, pass fluid through nozzle plate 300, circulate fluid between nozzle plate 300 and tower plate 200, and discharge fluid to outlet 116.

Referring again to FIG. 4, system 100 may include tower plate 200 having one or a plurality of towers surrounding corresponding battery cells. Fluid may pass from inlet 114 between bottom plate 118 and collector 112, through nozzle plate 300, into tower plate 200, between tower plate 200 and collector 112, and to outlet 116. As shown, tower plate 200 may include sets of towers (e.g., first, second, and third towers) configured to receive and contact respective battery cells, thereby dissipating from each battery cell to each respective set of towers.

Figure 8:
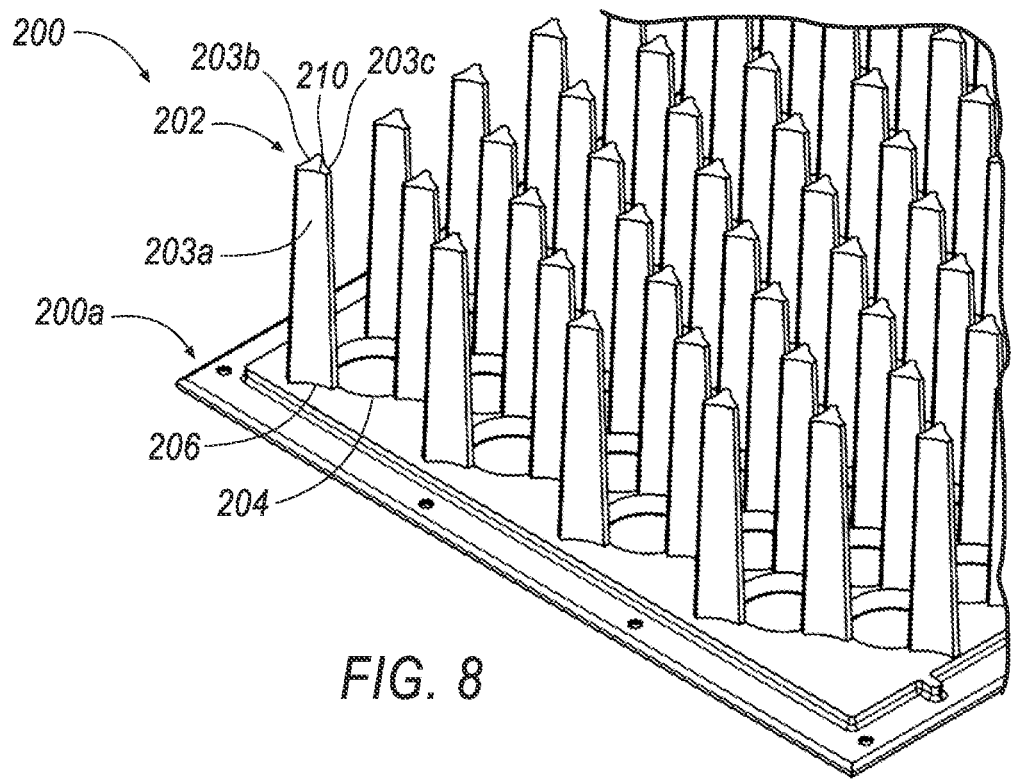
FIG. 8 illustrates a closer perspective view of a tower plate of the present disclosure.

FIG. 8 illustrates tower plate 200. Tower plate 200 may include a protrusion 202 having sidewalls 203a,b,c (e.g., concave sidewalls having inwardly curved surfaces), a closed distal end, and an open proximal end. Tower plate 200 may include an upward surface for engagement batteries 120 and a lower surface forming an internal cavity to receive nozzle protrusions 302. Tower plate 200 may include one or more battery cradle opening 204 to receive a battery cell and facilitate the flow of fluid around the battery cell.

Figure 9:
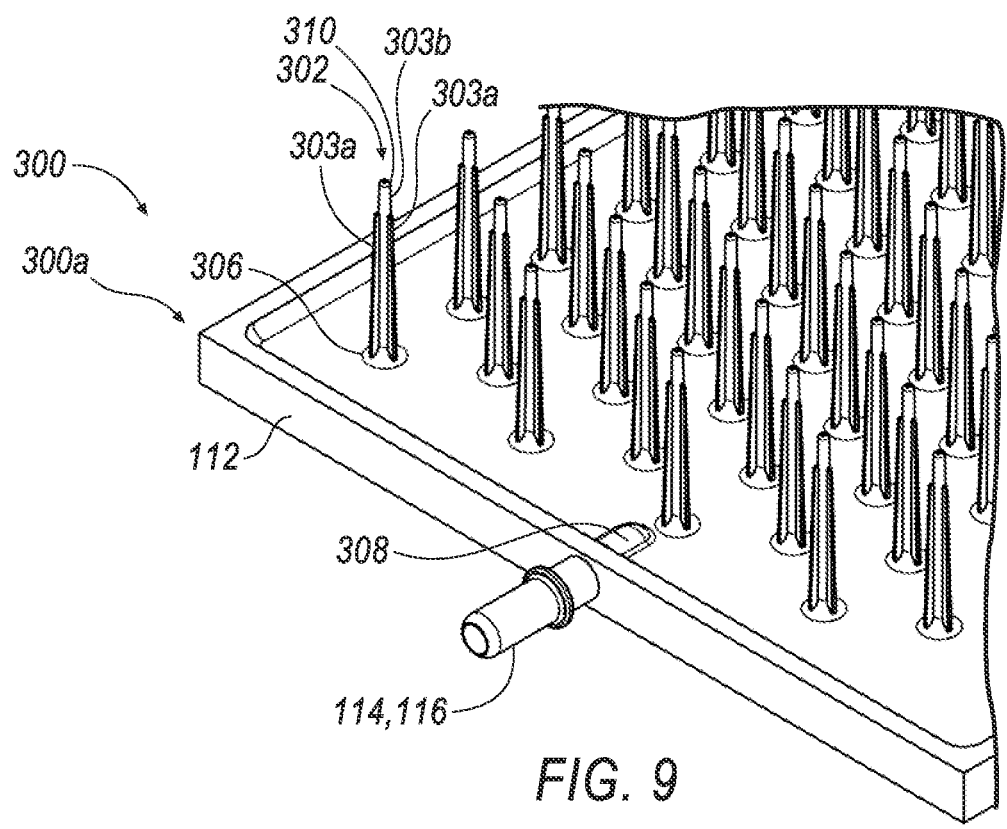
FIG. 9 illustrates a closer perspective view of a nozzle plate of the present disclosure.

FIG. 9 illustrates nozzle plate 300. Nozzle plate 300 may include a protrusion 302 (e.g., convex sidewalls having outwardly curved surfaces forming a round circumference), fins 303a,b,c (e.g., extending radially outwards), an open proximal end, and an open distal end. Nozzle plate 300 may include an upper surface having protrusions 302 configured to be received by the lower surface of tower plate 200 thereby forming the internal cavities therebetween. Nozzle plate 300 may include one or more inlets 114 and/or outlets 116.

Figure 10:
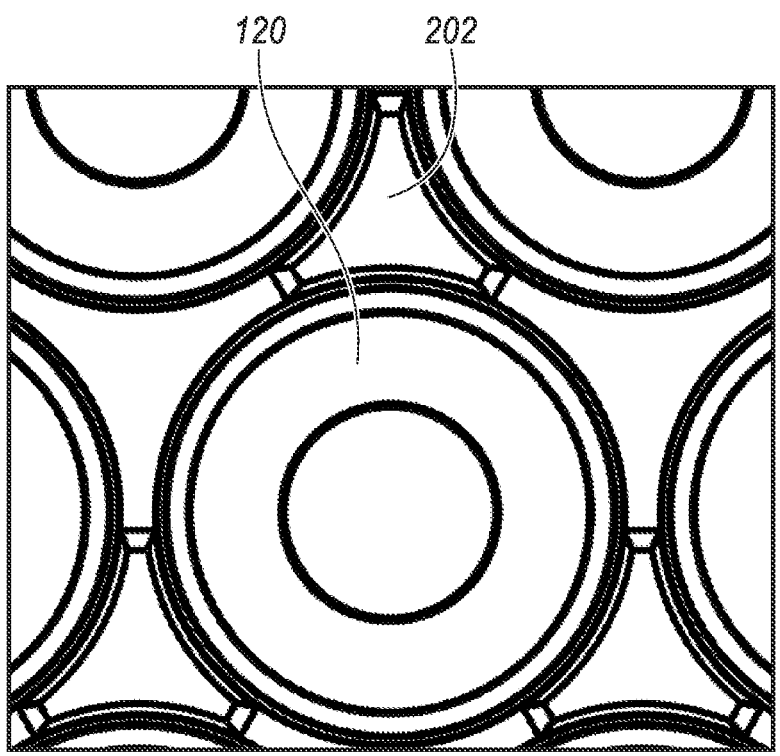
FIG. 10 illustrates a closer top view of FIG. 5.
Figure 11:
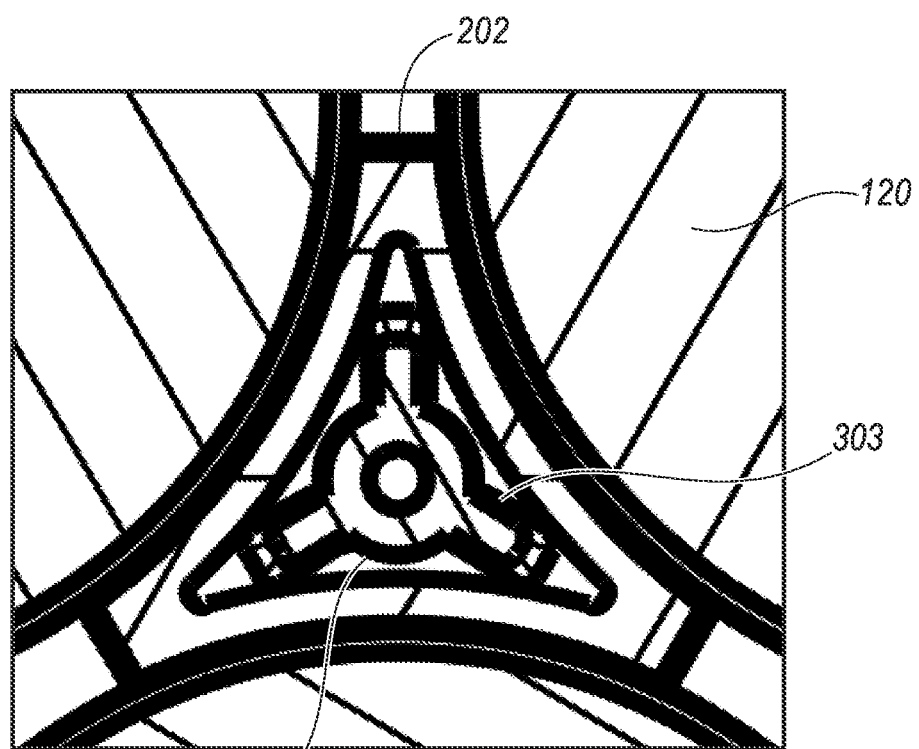
FIG. 11 illustrates a horizontal cross-section view of FIG. 4.

Referring to FIGS. 10-11, tower plate 200 may include an upper surface to receive batteries 120 and a lower surface to receive nozzle plate 200. As shown in FIG. 10, tower protrusions 202 may include inwardly curved sidewalls forming a concave triangular arrangement configured to be positioned against multiple battery cells 120. As shown in FIG. 11, each nozzle protrusion 302 may include outwardly curved sidewalls and radially extending fins forming a convex and/or triangular arrangement configured to be positioned in respective tower protrusions 202.

Figure 13:
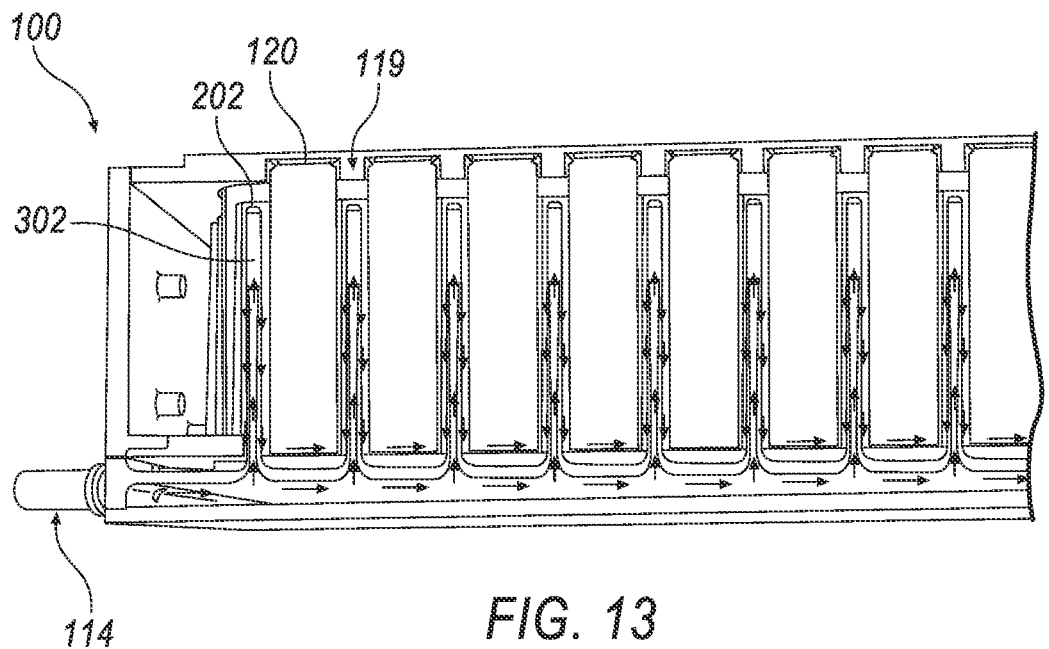
FIG. 13 illustrates a closer vertical cross-section view of an inlet side of FIG. 1.
Figure 14:
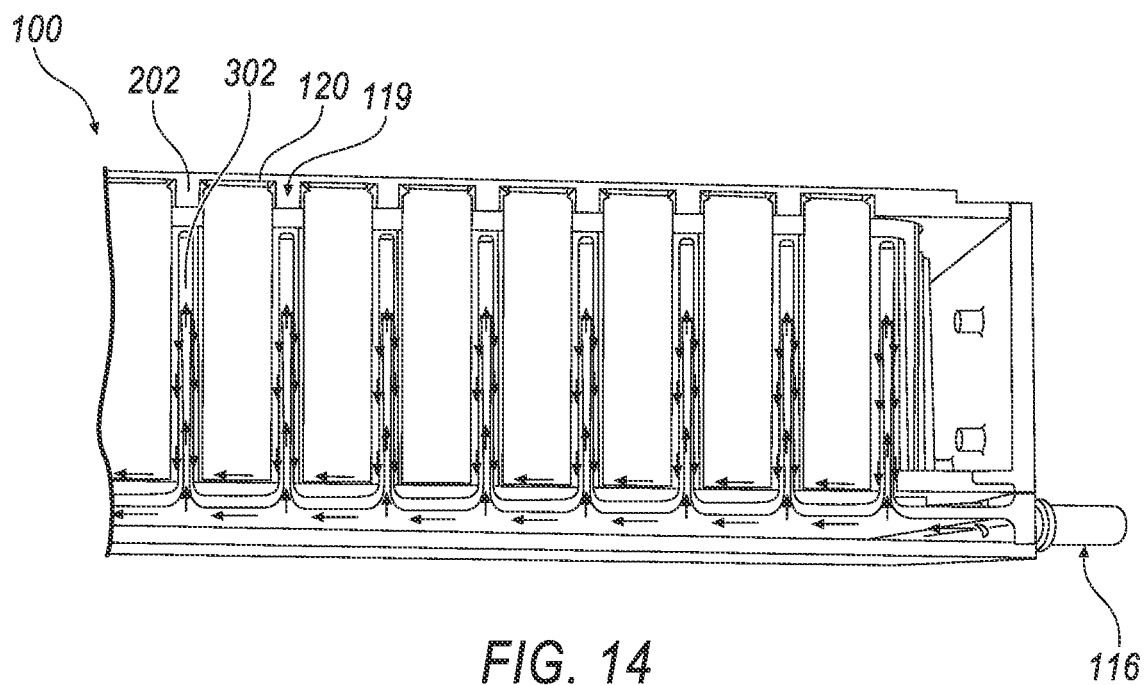
FIG. 14 illustrates a closer vertical cross-section view of an outlet side of FIG. 1.

Referring to FIGS. 12-14, system 100 is configured such that fluid flows from inlet 114, along and between a downward facing surface of collector 112 and an upward facing surface of bottom plate 118, upward along and between inner facing surfaces of each nozzle protrusion 302, through the open distal end of nozzle protrusion 302, into a cavity formed between each tower protrusion 202 and nozzle protrusion 302, downwards between the inward facing surface of tower protrusion 202 and the outward facing surface of nozzle protrusion 302, and horizontally between the downward facing surface of tower plate 200 and the upward facing surface of nozzle plate 300. The flow may then pass to the next battery 120 and corresponding tower protrusions 202 and nozzles protrusions 302, or out of system 100 via outlet 116.

Tower plate 200 and nozzle plate 300 may include any configuration configured to optimize heat transfer between fluid and battery cell 120. For example, plates 200, 300 may include a bubbler configuration in which each nozzle protrusion 302 has a nozzle cavity such that fluid flows upwardly and over the nozzle cavity and downwardly along an internal sidewall of each tower protrusion 202. Plates 200, 300 may include a baffle configuration in which each nozzle protrusion 302 is solid and directs fluid upwardly and over an outer sidewall of each nozzle protrusion 302 while the fluid flows along an internal sidewall of each tower protrusion 202. Plates 200, 300 may include a pin configuration in which each nozzle protrusion 302 extends into a flow of fluid such that fluid flows around each nozzle protrusion 302.

Figure 15:
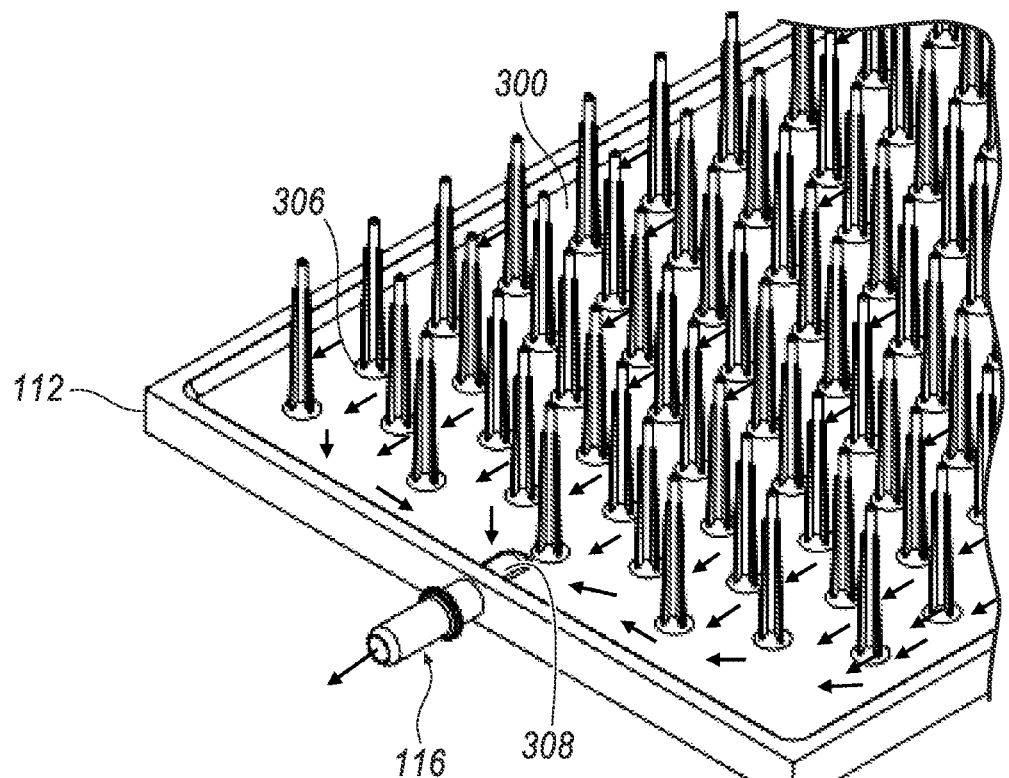
FIG. 15 illustrates a top perspective, cutaway view of FIG. 1.
Figure 16:
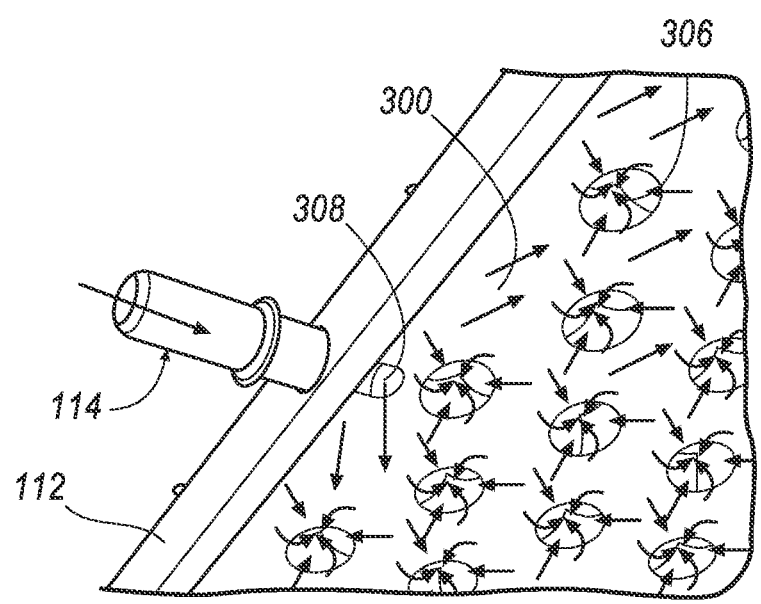
FIG. 16 illustrates a bottom perspective, cutaway view of FIG. 1.
Figure 17:
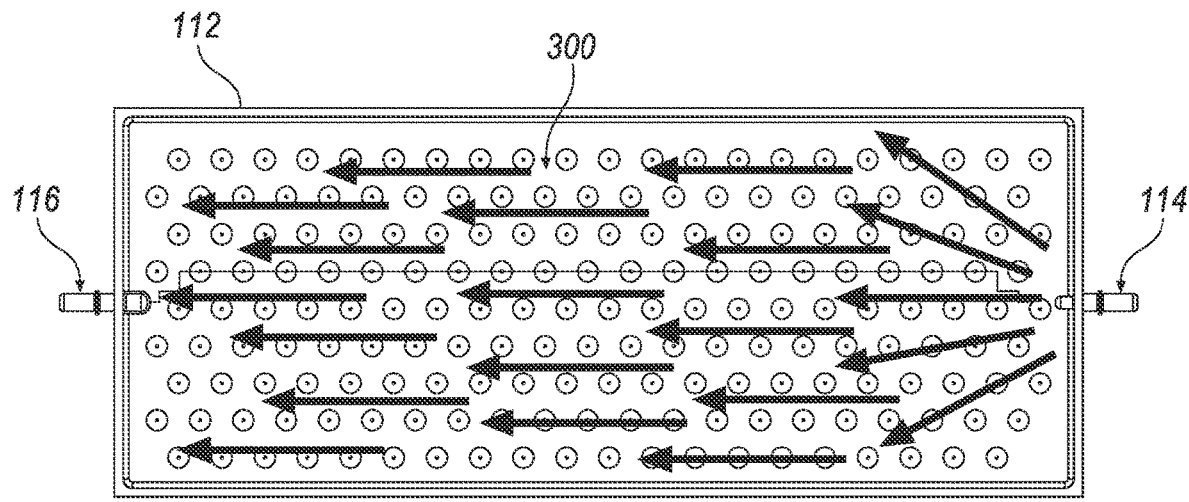
FIG. 17 illustrates a bottom plan, cutaway view of FIG. 1.
Figure 18:
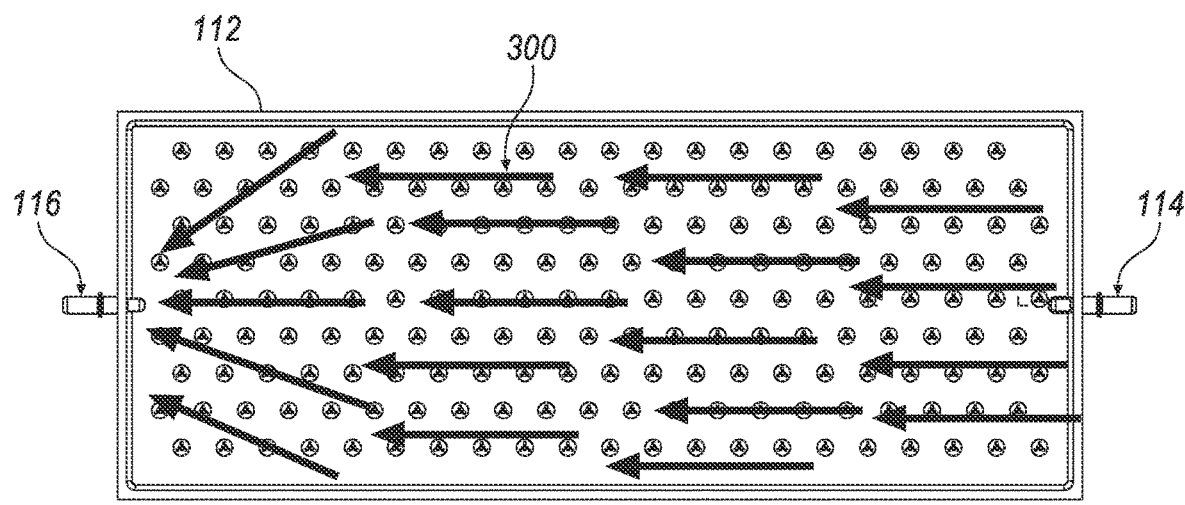
FIG. 18 illustrates a top plan, cutaway view of FIG. 1.

FIGS. 15-18 illustrate cutaway views of the upper surface of tower plate 200 and the lower surface of nozzle plate 300. As shown in FIGS. 16-17, fluid passes into inlet 114, along intake ramp 308, to the first or lower surface of collector 112, and into each nozzle cavity 306 of nozzle plate 300. Referring to FIGS. 15 and 18, fluid passes from each tower cavity 206 of tower plate 200 to a second or upper surface of collector 112, to a discharge ramp 208, and to outlet 116.

Figure 19:
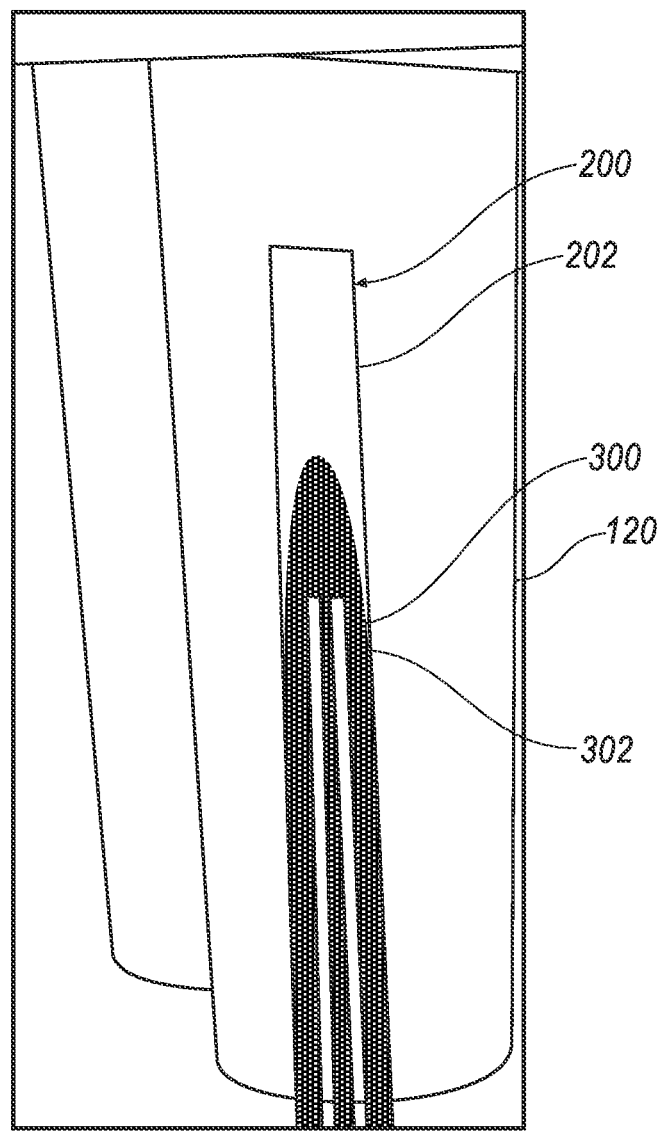
FIG. 19 illustrates a thermal simulation of parallel thermal management of the present disclosure.

As shown in FIG. 19, system 100 provides improved heat distribution along a lengthwise direction of the battery cell 120. Fluid passes through nozzle protrusion 302, circulates between nozzle protrusion 302 and tower protrusion 202, and passes out along the inner surface of tower protrusion 202. The lighter regions surrounding and at the distal end of the tower cavity of tower protrusion 202 reflect cooler regions due to the discharge of heated fluid along the middle and the proximal inner sidewalls of tower protrusion 202.

System 100 may include fixed, variable, and/or adaptive flow configurations. System 100 may include first and second tower plates 200 (e.g., upper and lower tower plates) and respective first and second nozzle plates 300 (e.g., corresponding upper and lower nozzle plates), e.g., which may be releasably connected via fasteners or snap-fit or permanently connected via adhesive bonding or ultrasonic welding. System 100 may include one or a plurality of inlets and outlets 114, 116 on any combination of the top, side, or bottom sides of system 100.

Figure 20:
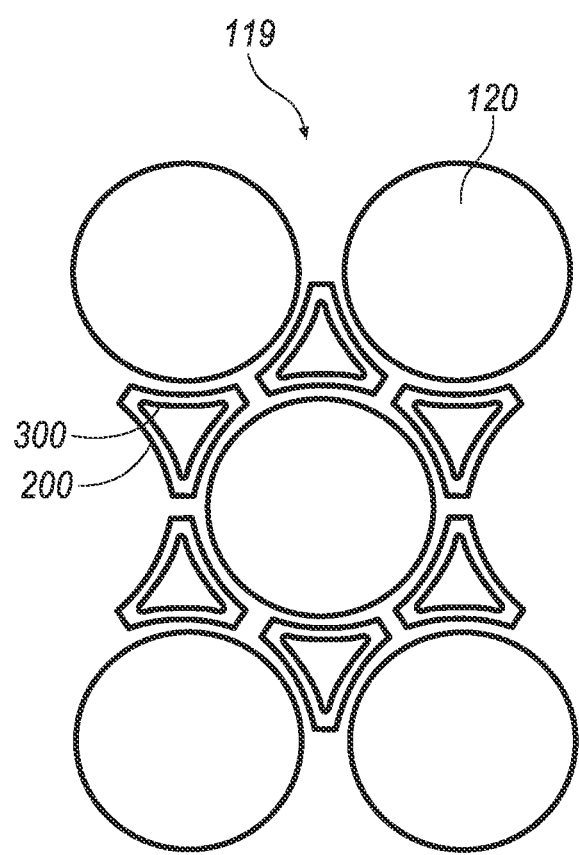
FIG. 20 illustrates an embodiment of the present disclosure, e.g., a tower-nozzle configuration having a triangular arrangement.
Figure 21:
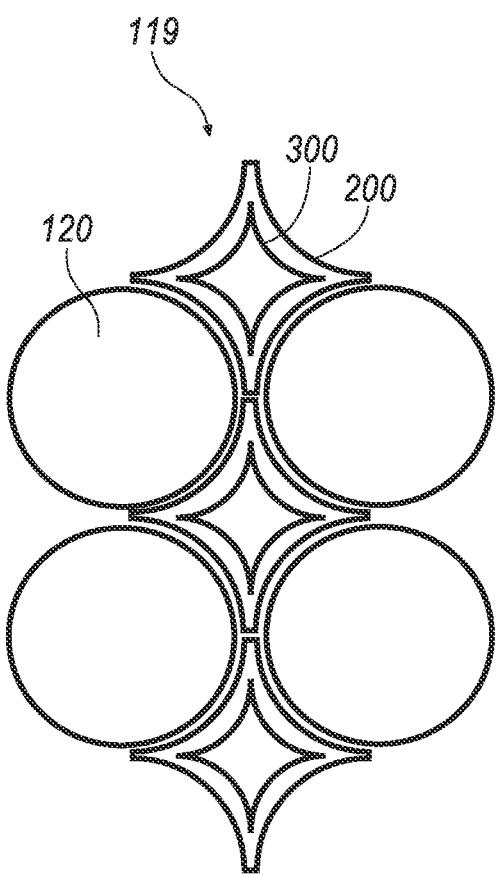
FIG. 21 illustrates an embodiment of the present disclosure, e.g., a tower-nozzle configuration having a rectangular arrangement.

FIGS. 20-21 illustrate embodiments of tower plates 200 and nozzle plates 300. Tower plates 200 and nozzle plates 300 may include respective protrusions 202 and 302 such that an outer sidewall of nozzle protrusion 302 corresponds to an inner sidewall of tower protrusion 202. One or multiple protrusions 202, 302 may be configured to contact one or more battery cells 120. Protrusions 202, 302 may be configured as polygons with round (e.g., concave) sidewalls such as triangles (FIG. 22) or rectangles (FIG. 23).

Figure 22:
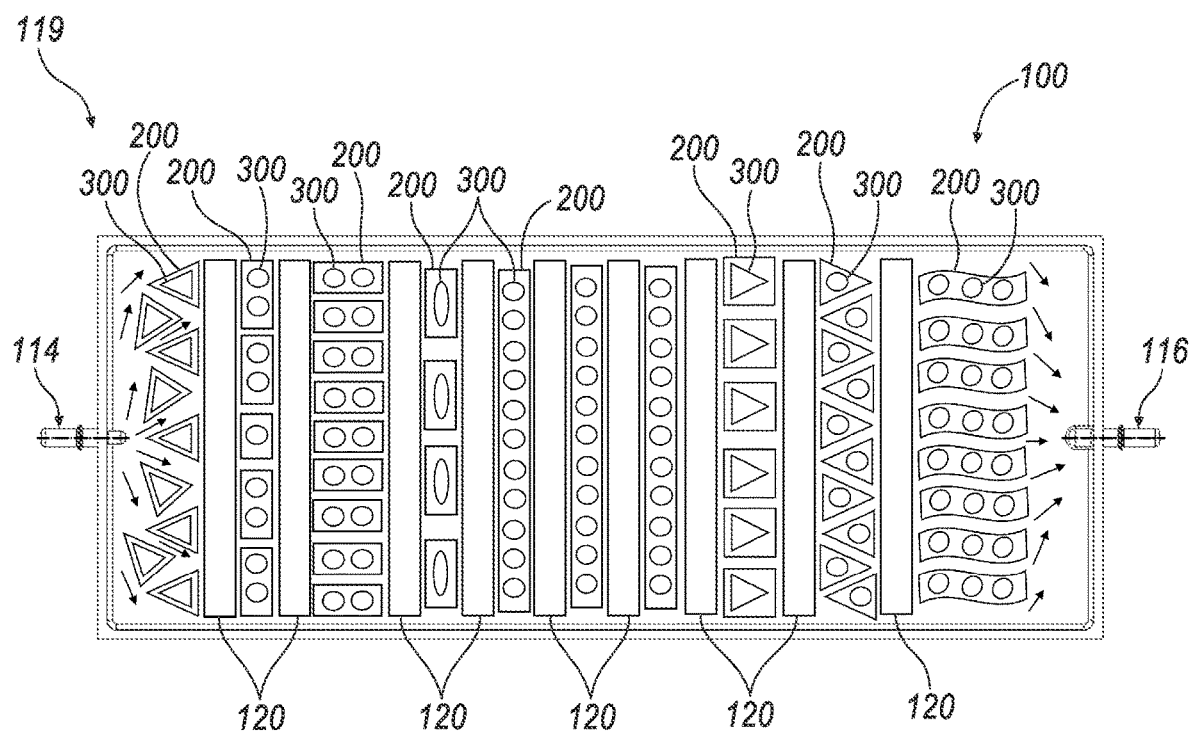
FIG. 22 illustrates an embodiment of the present disclosure, e.g., a tower-nozzle configuration having a variable arrangement.

As shown in FIG. 22, system 100 may be configured for one or more arrangements of plates 200, 300 adapted to one or more battery cells 120. Battery cells 120 may include any cell configuration such as cylindrical cells, rectangular cells, or pouch cells.

Figure 23:
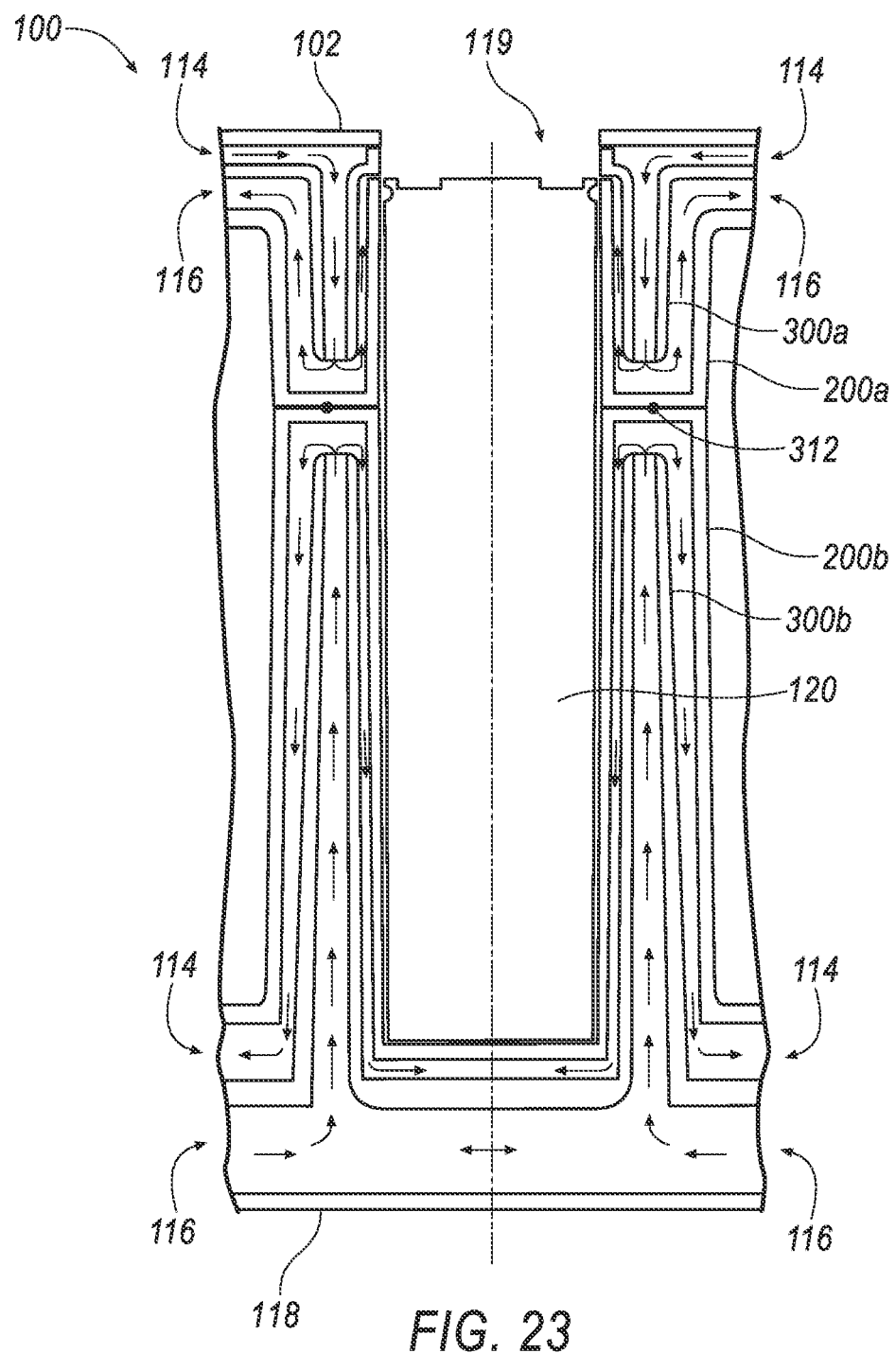
FIG. 23 illustrates an embodiment of the present disclosure, e.g., a mirrored configuration.
Figure 24:
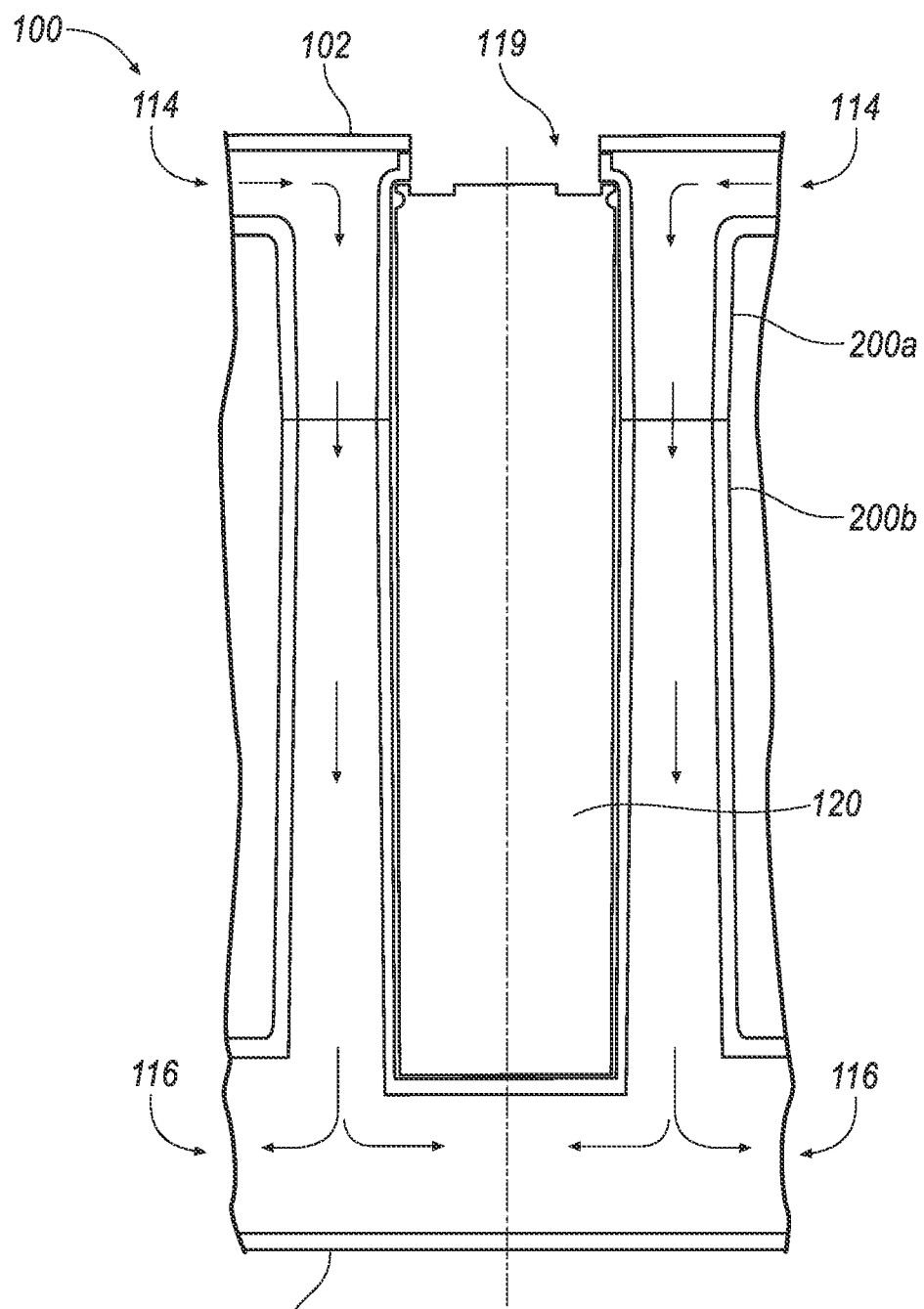
FIG. 24 illustrates an embodiment of the present disclosure, e.g., a flow-through configuration.
Figure 25:
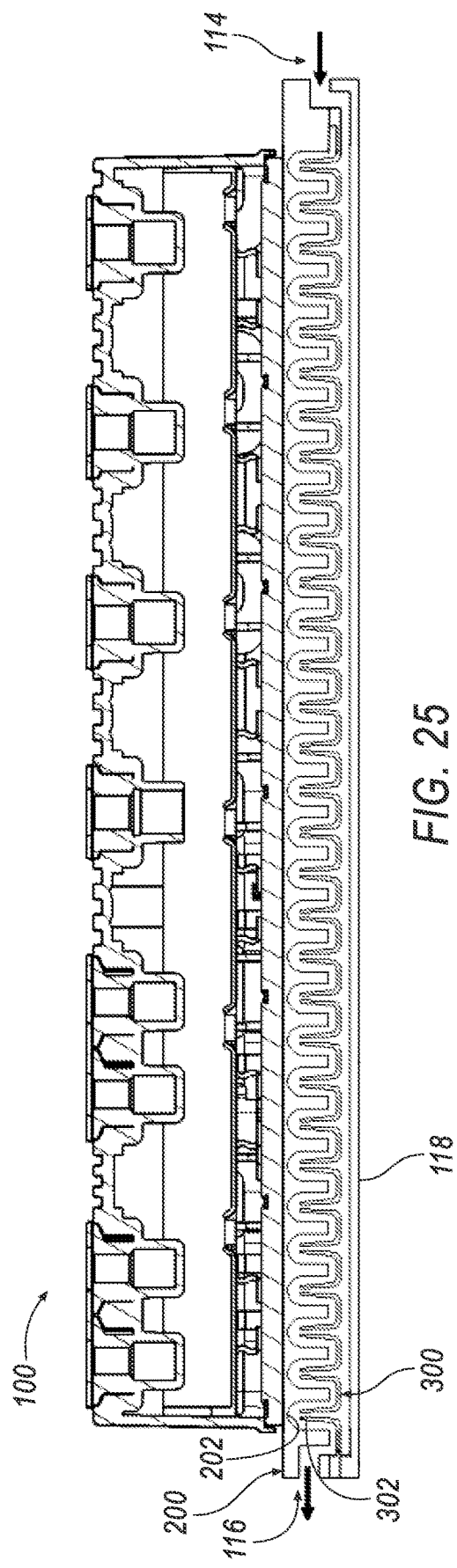
FIG. 25 illustrates an embodiment of the present disclosure, e.g., for thermal management of electrical components.

FIGS. 23-24 illustrate further embodiments of the present disclosure. As shown in FIG. 25, system 100 may be arranged as a mirrored embodiment including first and second tower plates 200a,b and first and second nozzle plates 300a,b in which inlet 114 is formed by nozzle plate 300 and outlet 116 is formed between nozzle plate 300 and tower plate 200. Referring to FIG. 24, system 100 may be arranged as a flow-through embodiment including first and second tower plates 200a,b in which inlet 114 is formed by tower plate 200a and outlet 116 is formed by tower plate 200b. Any of tower plates 200 and/or nozzle plates 300 may be releasably connected via fasteners or snap-fit or permanently connected via adhesive bonding or ultrasonic welding. System 100 may include inlets 114 and outlets 114 having opposite and additional flow directions, located on any top, side, bottom, inner, or outer wall of system 100, or a combination thereof.

Figure 26:
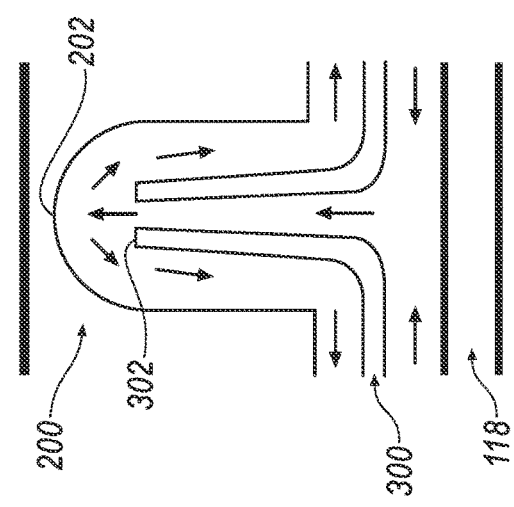
FIG. 26 illustrates a closer view of the embodiment of FIG. 25.

FIGS. 25-26 illustrate an embodiment of system 100, e.g., for thermal management of electrical components as disclosed herein. Tower plate 200 and nozzle plate 300 may be configured to provide improved heat dissipation over the majority or entirety of fluid-contact surfaces. Tower plate 200 and nozzle plate 300 may include one or more adjacent sets of tower protrusion 202 and nozzle protrusion 302. System 100 may direct fluid flow from inlet 114 through an array of one or more adjacent sets of tower protrusion 202 and nozzle protrusion 302, and to outlet 116.

Each adjacent set of tower protrusion 202 and nozzle protrusion 302 may direct fluid flow between an upper surface of bottom plate 118 and a lower surface of nozzle plate 300, upwards along and through nozzle protrusion 302, between an outer surface of nozzle protrusion 302 and an inner surface of tower protrusion 202, between a lower surface of tower plate 200 and an upper surface of needle plate 202 to outlet 116. This may provide multi-directional fluid flow for optimal thermal management.

Any portion of the systems, apparatuses, methods, and processes herein may occur in any arrangement, order, or sequence. Certain components or steps may occur simultaneously, others may be added, and/or others may be omitted. This disclosure illustrates certain embodiments and should in no way be construed to limit the claims.

The above description is intended to be illustrative and not restrictive. Many embodiments and applications other than the examples provided are apparent upon reading the above description. The scope should be determined, not based on the description alone, but should instead be determined regarding the claims, along with the full scope of equivalents to which such claims are entitled. Future developments will occur in the technologies discussed herein, and the disclosed systems and methods will be incorporated into such future embodiments. The embodiments of this disclosure are capable of modification, variation, and adaptation.

All terms used in the claims are intended to be given their broadest reasonable constructions and their ordinary meanings as understood by those knowledgeable in the technologies described herein unless an explicit indication to the contrary is made herein. Use of singular articles such as "a," "the," "said," etc. should be read to recite one or more of the indicated elements unless a claim recites an explicit limitation to the contrary.

The Abstract of the Disclosure is provided to allow the reader to ascertain the nature of the technical disclosure, but it should not be used to interpret or limit the scope or meaning of the claims. Various features of this disclosure may be grouped in various embodiments to streamline the disclosure, but the claimed embodiments shall not be interpreted as requiring more features than are expressly recited in each claim. The inventive subject matter of the claims lies in less than all features of a single disclosed embodiment. The claims are hereby incorporated into the Detailed Description, with each claim standing on its own as a separately claimed subject matter.

What is claimed is:

1. A system for parallel thermal management of one or more battery cells, the system comprising:
    a tower plate having a plurality of generally hollow tower protrusions extending therefrom, each tower protrusion including an open proximal end attached to the tower plate, an opposing closed distal end, and an inner sidewall extending between the closed distal end and the open proximal end; and
    a nozzle plate having a plurality of nozzle protrusions extending therefrom, each nozzle protrusion including an open proximal end attached to the nozzle plate, an opposing open distal end, an outer sidewall extending between the open distal end and the open proximal end, and one or more radially extending fins projecting along at least a portion of the outer sidewall;
    wherein each tower protrusion is configured to receive respective one of the nozzle protrusions to fluidly connect the tower plate with the nozzle plate such that a cavity is formed between the inner sidewall of each tower protrusion and the outer sidewall of the respective one of the nozzle protrusions; and
    wherein the nozzle plate is adapted to allow a fluid to pass through the cavity to provide thermal management for the one or more battery cells.

2. The system of claim 1, wherein the inner sidewall of each of the plurality of tower protrusions is inwardly curved, and wherein the outer sidewall of each of the nozzle protrusions is outwardly curved.

3. The system of claim 1, further comprising a collector having vertical sidewalls, an inlet, and an outlet.

4. The system of claim 1, further comprising a collector having sidewalls that downwardly extend from the nozzle plate.

5. The system of claim 1, further comprising a bottom plate configured to be received against a lower surface of the nozzle plate.

6. The system of claim 1, wherein each of the tower protrusions includes an outer sidewall that forms a concave triangular arrangement configured to engage the one or more battery cells.

7. The system of claim 1, wherein the outer sidewall of each of the nozzle protrusions forms a convex triangular arrangement configured to engage the fluid within respective one of the tower protrusions.

8. A system for parallel thermal management of one or more battery cells, the system comprising:
   a tower plate having at least one tower protrusion extending therefrom, the at least one tower protrusion including an open proximal end attached to the tower plate, an opposing closed distal end, and an inner sidewall extending between the closed distal end and the open proximal end; and
   a nozzle plate having at least one nozzle protrusion extending therefrom, the at least one nozzle protrusion including an open proximal end attached to the nozzle plate, an opposing open distal end, and an outer sidewall extending between the open distal end and the open proximal end;
   wherein the at least one tower protrusion is configured to receive the at least one nozzle protrusion to fluidly connect the tower plate with the nozzle plate such that a cavity is formed between the inner sidewall of the at least one tower protrusion and the outer sidewall of the at least one nozzle protrusion; and
   wherein the nozzle plate is adapted to allow a fluid to pass through the cavity to provide thermal management for the one or more battery cells.

9. The system of claim 8, wherein the inner sidewall of the at least one tower protrusion is inwardly curved, and wherein the outer sidewall of the at least one nozzle protrusion is outwardly curved.

10. The system of claim 8, further comprising a collector having vertical sidewalls, an inlet, and an outlet.

11. The system of claim 8, further comprising a collector having sidewalls that downwardly extend from the nozzle plate.

12. The system of claim 8, further comprising a bottom plate configured to be received against a lower surface of the nozzle plate.

13. The system of claim 8, wherein the at least one tower protrusion includes an outer sidewall that forms a concave triangular arrangement configured to engage the one or more battery cells.

14. The system of claim 8, wherein the outer sidewall of the at least one nozzle protrusion forms a convex triangular arrangement configured to engage the fluid within the at least one tower protrusion.

15. A method of parallel thermal management of one or more battery cells, the method comprising:
   providing a collector including a lower surface, an upper surface, vertical sidewalls, an inlet, and an outlet;
   providing a tower plate having a plurality of tower protrusions extending therefrom, each tower protrusion including an open proximal end attached to the tower plate, an opposing closed distal end, and an inner sidewall extending between the closed distal end and the open proximal end;
   providing a nozzle plate having a plurality of nozzle protrusions extending therefrom, each nozzle protrusion including an open proximal end attached to the nozzle plate, an opposing open distal end, an outer sidewall extending between the open distal end and the open proximal end, and one or more radially extending fins projecting along at least a portion of the outer sidewall;
   fluidly connecting the tower plate with the nozzle plate by inserting each nozzle protrusion into respective one of the tower protrusions such that a cavity is formed between the outer sidewall of each nozzle protrusion and the inner sidewall of the respective one of the tower protrusions; and
   allowing a fluid to pass through the inlet, along the lower surface of the collector, through the plurality of nozzle protrusions, within the cavity, along the upper surface of the collector, and through the outlet.

16. The method of claim 15, wherein the step of fluidly connecting includes receiving by each tower protrusion respective one of the nozzle protrusions, each of the plurality of nozzle protrusions having one or more radially extending fins projecting along at least a portion of the outer sidewall of each nozzle protrusion.

17. The method of claim 15, wherein the collector includes vertical sidewalls that downwardly extend from the nozzle plate.

18. The method of claim 15, further comprising providing a bottom plate configured to be received against a lower surface of the nozzle plate.

19. The method of claim 15, further comprising engaging the one or more battery cells by a concave triangular arrangement formed by one or more outer sidewalls of each of the plurality of tower protrusions.

20. The method of claim 15, further comprising engaging the fluid between the inner sidewall of each of the plurality of tower protrusions and the outer sidewall of respective one of the nozzle protrusions.

* * * * *